United States Patent
Wu

(10) Patent No.: US 9,723,645 B2
(45) Date of Patent: Aug. 1, 2017

(54) DEVICE AND METHOD OF HANDLING DEVICE-TO-DEVICE COMMUNICATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 39 days.

(21) Appl. No.: 14/798,439

(22) Filed: Jul. 13, 2015

(65) Prior Publication Data

US 2016/0014835 A1 Jan. 14, 2016

Related U.S. Application Data

(60) Provisional application No. 62/023,969, filed on Jul. 14, 2014.

(51) Int. Cl.
*H04W 76/02* (2009.01)
*H04W 8/00* (2009.01)

(52) U.S. Cl.
CPC ......... *H04W 76/023* (2013.01); *H04W 8/005* (2013.01)

(58) Field of Classification Search
CPC ............................ H04W 76/023; H04W 8/005
See application file for complete search history.

(56) References Cited

U.S. PATENT DOCUMENTS

| | | | | |
|---|---|---|---|---|
| 2014/0295815 A1* | 10/2014 | Cho | ...... | H04W 40/20 455/418 |
| 2015/0208262 A1* | 7/2015 | Siomina | ...... | H04W 64/00 370/252 |
| 2015/0312952 A1* | 10/2015 | Fodor | ...... | H04W 72/1215 370/329 |
| 2015/0327157 A1* | 11/2015 | Al-Shalash | ...... | H04W 48/16 370/328 |
| 2015/0382385 A1* | 12/2015 | Cai | ...... | H04W 76/021 370/254 |

OTHER PUBLICATIONS

3GPP TS 23.303 V12.1.0 (Jun. 2014) Technical Specification 3rd Generation Partnership Project; Technical Specification Group Services and System Aspects; Proximity-based services (ProSe); Stage 2 (Release 12).

* cited by examiner

*Primary Examiner* — Duc C Ho
(74) *Attorney, Agent, or Firm* — Winston Hsu

(57) ABSTRACT

A communication device for handling a device-to-device (D2D) communication comprises a storage unit for storing instructions and a processing means coupled to the storage unit. The processing means is configured to execute the instructions stored in the storage unit. The instructions comprises receiving an announcement message comprising a proximity-based service (ProSe) Application Code comprising a public land mobile network (PLMN) identity; receiving system information comprising a plurality of PLMN identities; setting a monitored PLMN identity to the PLMN identity, if the plurality of PLMN identities comprises the PLMN identity; and transmitting a match report message comprising the monitored PLMN identity.

15 Claims, 6 Drawing Sheets

DEVICE AND METHOD OF HANDLING DEVICE-TO-DEVICE COMMUNICATION

CROSS REFERENCE TO RELATED APPLICATIONS

This application claims the benefit of U.S. Provisional Application No. 62/023,969, filed on Jul. 14, 2014 and incorporated herein by reference.

BACKGROUND OF THE INVENTION

1. Field of the Invention

The present invention is related to a communication device and a method used in a wireless communication system, and more particularly, to a communication device and a method of handling a device-to-device communication in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other (e.g., directly) according to the D2D communication, and the eNB may not need to forward the packets transmitted between the UEs. According to the D2D communication, the UEs may communicate with each other via UL resources (e.g., UL subframes configured by the eNB). In general, the D2D communication may also be seen as a D2D service (i.e., proximity-based service (ProSe)). The D2D service can be a ProSe direct discovery or a ProSe direct communication. In addition, a D2D subframe, D2D transmission, D2D communication and D2D discovery can be termed as a sidelink subframe, sidelink transmission, sidelink communication and sidelink discovery, respectively.

In certain situations, an eNB (or radio access network (RAN)) may control multiple public land mobile networks (PLMNs) (i.e., the eNB (or RAN) is shared by the PLMNs), and the eNB broadcasts PLMN identities of the PLMNs to UEs. A monitoring UE in a coverage area of the eNB (e.g., camping on the eNB) may receive both an announcement message (e.g., for ProSe discovery) transmitted by an announcing UE and the PLMN identities. The monitoring UE is not able to determine a monitored PLMN according to the announcement message and the PLMN identities. The monitored PLMN may be a PLMN in which the monitoring UE has monitored a ProSe Application Code. A ProSe function of a PLMN that assigns the ProSe Application Code may perform improper operations, if the monitoring UE reports a wrong monitored PLMN identity to the Prose function. The Prose function may be a ProSe Function of a home PLMN (HPLMN) of the announcing UE. The improper operations may include that the ProSe function incorrectly determines that a received ProSe Application Code is authorized (or not authorized) to be transmitted on the monitored PLMN.

Thus, it is important to solve the reception/transmission of multiple PLMN identities when the eNB are shared by the PLMNs.

SUMMARY OF THE INVENTION

The present invention therefore provides a communication device and a method for handling a device-to-device communication to solve the abovementioned problem.

A communication device for handling a device-to-device (D2D) communication comprises a storage unit for storing instructions and a processing means coupled to the storage unit. The processing means is configured to execute the instructions stored in the storage unit. The instructions comprises receiving an announcement message comprising a proximity-based service (ProSe) Application Code comprising a public land mobile network (PLMN) identity; receiving system information comprising a plurality of PLMN identities; setting a monitored PLMN identity to the PLMN identity, if the plurality of PLMN identities comprises the PLMN identity; and transmitting a match report message comprising the monitored PLMN identity.

A communication device for handling a device-to-device (D2D) communication comprises a storage unit for storing instructions and a processing means coupled to the storage unit. The processing means is configured to execute the instructions stored in the storage unit. The instructions comprises receiving an announcement message comprising a ProSe Application Code comprising a proximity-based service (ProSe) identity; receiving system information comprising a plurality of public land mobile network (PLMN) identities; setting a plurality of monitored PLMN identities to the plurality of PLMN identities; and transmitting a match report message comprising the ProSe Application Code and the plurality of monitored PLMN identities.

A communication device for handling a device-to-device (D2D) communication comprises a storage unit for storing instructions and a processing means coupled to the storage unit. The processing means is configured to execute the instructions stored in the storage unit. The instructions comprises transmitting an announcement message comprising a proximity-based service (ProSe) Application Code and a public land mobile network (PLMN) identity to a monitoring communication device.

A communication device for handling a device-to-device (D2D) communication comprises a storage unit for storing instructions and a processing means coupled to the storage unit. The processing means is configured to execute the instructions stored in the storage unit. The instructions comprises configuring an association between a proximity-based service (ProSe) Application Code and an identity of an announcing communication device; receiving a match report message including the ProSe Application Code transmitted by the announcing communication device; transmitting a first message including the identity to a network node according to the association between the ProSe Application Code and the identity; receiving a public land mobile network (PLMN) identity of a registered PLMN of the announcing communication device from the network node, wherein the network node transmits the PLMN identity in response to the first message; and determining whether the announcing communication device is authorized to transmit an announcement message including the ProSe Application Code according to the PLMN identity of the registered PLMN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
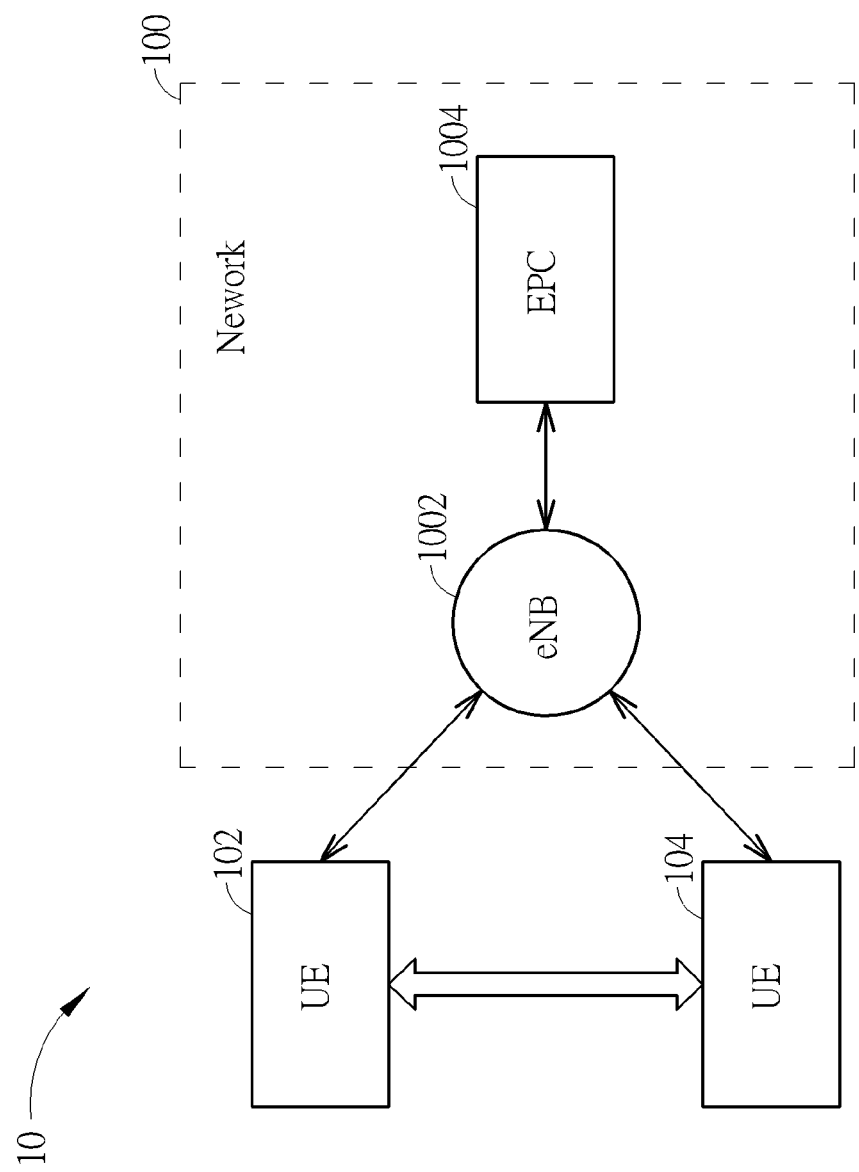
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 100 and user equipments (UEs) 102 and 104. In FIG. 1, the network 100 and the UEs 102 and 104 are simply utilized for illustrating the structure of the wireless communication system 10. A UE may communicate with the network 100 according to a device-to-cellular (D2C) communication (i.e., device-to-network (D2N) communication) defined in a communication standard, e.g., the 3rd Generation Partnership Project (3GPP) standard. Practically, the network 100 can be a universal terrestrial radio access network (UTRAN) comprising at least one Node-B (NB) in a universal mobile telecommunications system (UMTS). In another example, the network 100 can be an evolved UTRAN (E-UTRAN) comprising at least one evolved NB (eNB) and/or at least one relay station in a long term evolution (LTE) system, a LTE-Advanced (LTE-A) system or an evolution of the LTE-A system. As an example, the network 100 includes an eNB 1002 connected to an evolved packet core (EPC) 1004 in FIG. 1.

Furthermore, the network 100 can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network 100 receives information transmitted by a UE (e.g., the UE 102 and/or the UE 104), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A UE (e.g., the UE 102 and/or the UE 104) can be a low cost device (e.g., machine type communication (MTC) device), a device-to-device (D2D) device, a mobile phone, a laptop, a tablet computer, an electronic book, a portable computer system, or combination thereof. In addition, for the D2C communication, the network 100 and the UE can be seen as a transmitter or a receiver according to direction (i.e., transmission direction), e.g., for an uplink (UL), the UE is the transmitter and the network 100 is the receiver, and for a downlink (DL), the network 100 is the transmitter and the UE is the receiver.

In addition, the UEs 102 and 104 may communicate with each other directly, after an initialization (e.g., connection establishment and/or peer discovery) is performed. For example, the initialization may be assisted by the network 100. That is, the UEs 102 and 104 may communicate (e.g., transmit and/or receive signals/packets) with each other according to a D2D communication defined in a communication standard, e.g., 3GPP standard. The UEs 102 and 104 may communicate with each other via UL resources (e.g., UL subframes or UL carriers) determined according to frequency-division duplexing (FDD) configuration and/or time-division duplexing (TDD) configurations. In one example, the UE 102 may communicate with the UE 104 in a UL subframe and with the network 100 in another subframe. In another example, the UE 102 may communicate with the UE 104 and the network 100 simultaneously, i.e., both the D2D communication and the D2C communication are realized at the same time.

Figure 2:
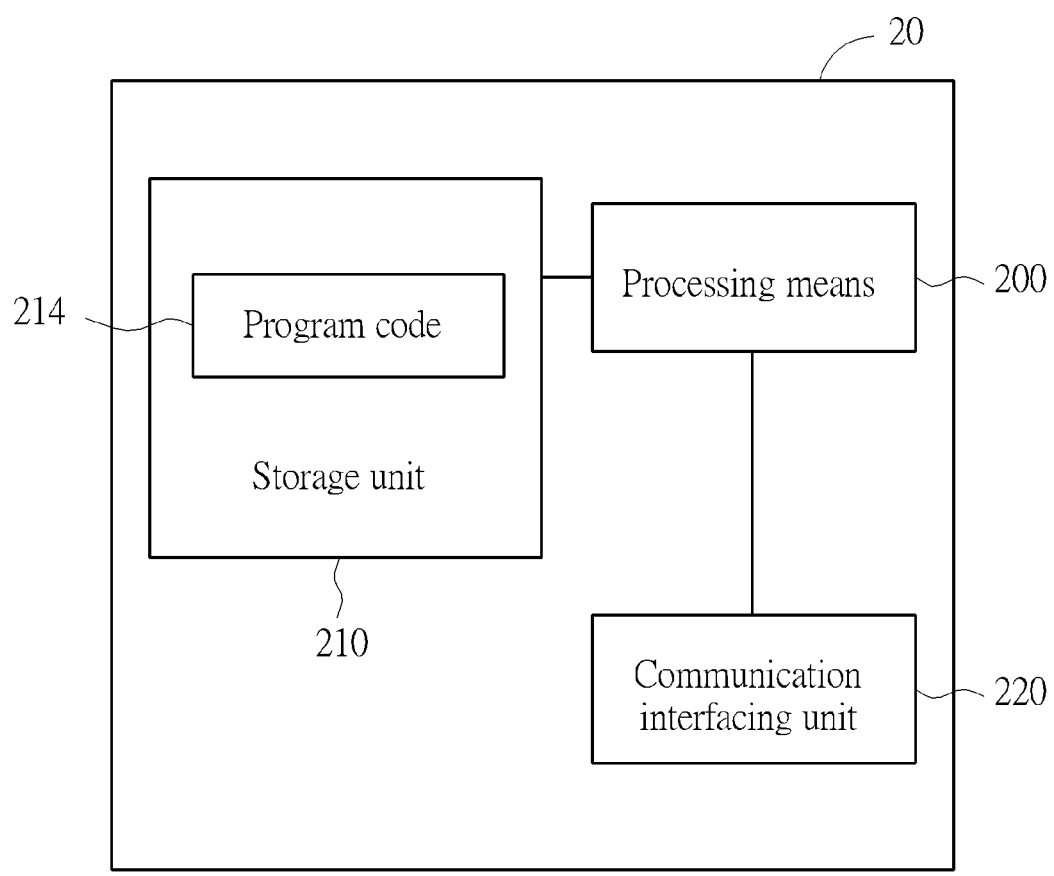
FIG. 2 is a schematic diagram of a communication device according to an example of the present invention.

FIG. 2 is a schematic diagram of a communication device 20 according to an example of the present invention. The communication device 20 may be used for realizing the network 100 (e.g., the eNB 1002 and/or the EPC 1004), the UE 102 and/or the UE 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
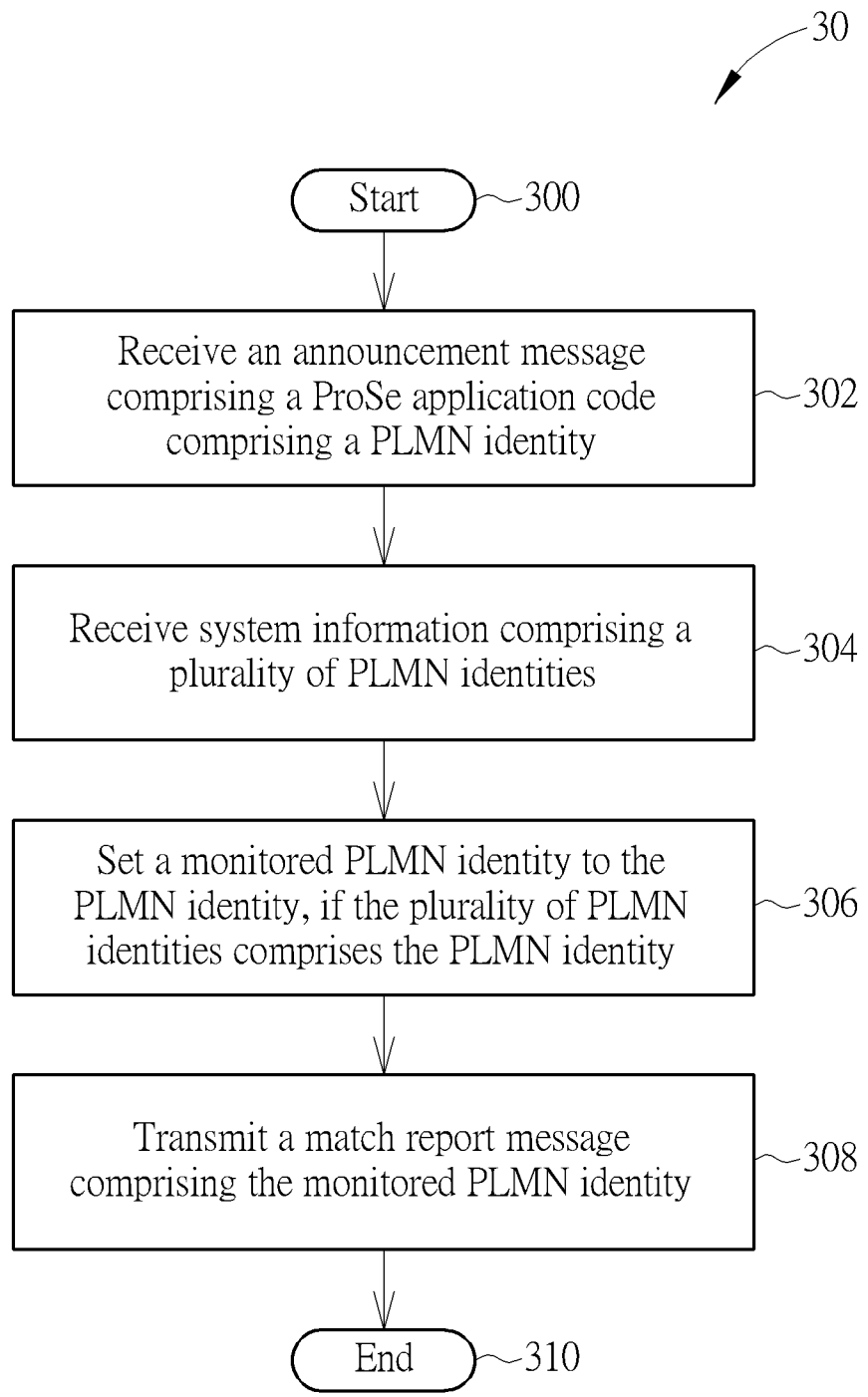
FIG. 3 is a flowchart of a process according to an example of the present invention.

FIG. 3 is a flowchart of a process 30 according to an example of the present invention. The process 30 may be utilized in a monitoring UE (e.g., the UE 102 or the UE 104)

shown in FIG. 1, to handle a D2D communication. The process 30 may be compiled into the program code 214 and includes the following steps:

Step 300: Start.

Step 302: Receive an announcement message comprising a proximity-based service (ProSe) Application Code comprising a public land mobile network (PLMN) identity.

Step 304: Receive system information comprising a plurality of PLMN identities.

Step 306: Set a monitored PLMN identity to the PLMN identity, if the plurality of PLMN identities comprises the PLMN identity.

Step 308: Transmit a match report message comprising the monitored PLMN identity.

Step 310: End.

According to the process 30, the monitoring UE receives an announcement message comprising a ProSe Application Code comprising a PLMN identity, and receives system information comprising a plurality of PLMN identities. Then, the monitoring UE sets a monitored PLMN identity to the PLMN identity if the plurality of PLMN identities comprises the PLMN identity, and transmits a match report message comprising the monitored PLMN identity. That is, the monitoring UE reports the PLMN identity in the system information as the monitored PLMN identity, if the PLMN identity is one of the PLMN identities received in the system information. Thus, a rule for determining the monitored PLMN identity is proposed according to the process 30, when multiple PLMN identities are received. The problem of reception of multiple PLMN identities is solved.

Realization of the present invention is not limited to the above description.

In one example, the announcement message may be transmitted by an announcing UE (e.g., the UE 102 or the UE 104). In one example, the system information may be received via a cell of a network (e.g., the network 100). In one example, the plurality of PLMN identities may be indicated by PLMN-IdentityList in the system information. A monitored PLMN identity may be a PLMN identity of a monitored PLMN where a monitoring UE locates.

According to the above description, an example is illustrated as follows. A monitoring UE may receive an announcement message transmitted by an announcing UE, and the announcement message may include a ProSe Application Code composed of a PLMN identity and a temporary identity. The monitoring UE may also receive a plurality of PLMN identities (e.g., PLMN-IdentityList) in system information (e.g., SystemInformationBlockType1). The monitoring UE may set a monitored PLMN identity to the PLMN identity included in the ProSe Application Code, if the PLMN identity is one of the plurality of PLMN identities. Then, the monitoring UE may transmit a match report message including the monitored PLMN identity (and maybe also other control information), e.g., to a Prose function of a home PLMN (HPLMN) of the monitoring UE, to complete a match report procedure (e.g., roaming or non-roaming). The system information mentioned above may be broadcasted by a cell where the monitoring UE camps or a cell where the announcing UE camps, and is not limited herein.

In another example, it may not be necessary for the monitoring UE to include the monitored PLMN identity in the match report message if the PLMN identity included in the ProSe Application Code is one of the plurality of PLMN identities received in the system information, because the PLMN identity is included in the ProSe Application Code.

That is, the monitored PLMN identity is not reported in the match report message, if the PLMN identity is one of the PLMN identities.

Figure 4:
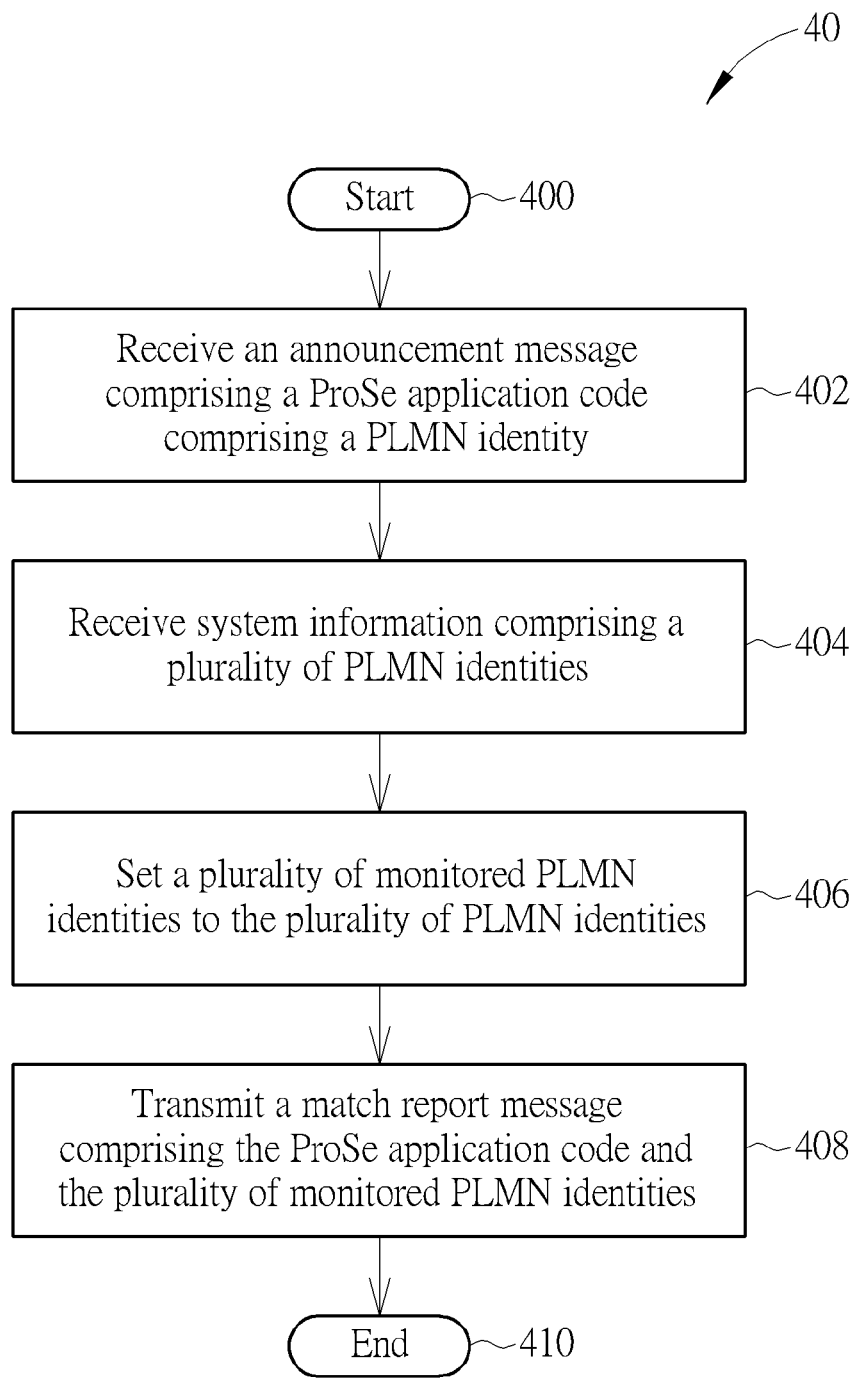
FIG. 4 is a flowchart of a process according to an example of the present invention.

FIG. 4 is a flowchart of a process 40 according to an example of the present invention. The process 40 may be utilized in a monitoring UE (e.g., the UE 102 or the UE 104) shown in FIG. 1, to handle a D2D communication. The process 40 may be compiled into the program code 214 and includes the following steps:

Step 400: Start.

Step 402: Receive an announcement message comprising a ProSe Application Code comprising a PLMN identity.

Step 404: Receive system information comprising a plurality of PLMN identities.

Step 406: Set a plurality of monitored PLMN identities to the plurality of PLMN identities.

Step 408: Transmit a match report message comprising the ProSe Application Code and the plurality of monitored PLMN identities.

Step 410: End.

According to the process 40, the monitoring UE receives an announcement message comprising a ProSe Application Code comprising a PLMN identity, and receives system information comprising a plurality of PLMN identities. Then, the monitoring UE sets a plurality of monitored PLMN identities to the plurality of PLMN identities, and transmits a match report message comprising the ProSe Application Code and the plurality of monitored PLMN identities. That is, the monitoring UE reports the PLMN identities in the system information as the monitored PLMN identities, and transmits the monitored PLMN identities with the ProSe Application Code in the match report message. Thus, a rule for determining the monitored PLMN identity is proposed according to the process 40, when multiple PLMN identities are received. The problem of reception of multiple PLMN identities is solved.

Realization of the present invention is not limited to the above description.

In one example, the announcement message may be transmitted by an announcing UE (e.g., the UE 102 or the UE 104). In one example, the system information may be received via a cell of a network (e.g., the network 100). In one example, the plurality of PLMN identities may be indicated by PLMN-IdentityList in the system information. A monitored PLMN identity may be a PLMN identity of a monitored PLMN where a monitoring UE locates.

According to the above description, an example is illustrated as follows. A monitoring UE may receive an announcement message transmitted by an announcing UE, and the announcement message may include a ProSe Application Code composed of a PLMN identity and a temporary identity. The monitoring UE may also receive a plurality of PLMN identities (e.g., PLMN-IdentityList) in system information (e.g., SystemInformationBlockType1). The monitoring UE may set a plurality of monitored PLMN identities to the plurality of PLMN identities in the system information. Then, the monitoring UE may transmit a match report message including the ProSe Application Code and the monitored PLMN identities (and maybe also other control information), e.g., to a Prose function of a HPLMN of the monitoring UE, to complete a match report procedure (e.g., roaming or non-roaming). The ProSe function of the HPLMN of the monitoring UE may transmit the ProSe Application Code and the plurality of monitored PLMN identities to a ProSe function assigning the ProSe Application Code.

After the ProSe function assigning the ProSe Application Code receives the ProSe Application Code and the plurality of monitored PLMN identities, the ProSe function may check whether the ProSe Application Code is authorized to be transmitted in any of a plurality of monitored PLMNs identified by the plurality of monitored PLMN identities. If any of the plurality of monitored PLMNs is authorized, the ProSe function assigning the ProSe Application Code may transmit a match report acknowledgement message including ProSe Application ID Name (s) to the ProSe function of the HPLMN of the monitoring UE. Then, the Prose function of the HPLMN of the monitoring UE may transmit the ProSe Application ID Name(s) to the monitoring UE. The system information mentioned above may be broadcasted by a cell where the monitoring UE camps or a cell where the announcing UE camps, and is not limited herein.

It should be noted that those skilled in the art can readily combine process 30 and process 40 to form another solution. For example, a monitoring UE may perform the process 40 (e.g., steps 406 and 408), if a PLMN identity in a ProSe Application Code is not one of PLMN identities received in system information.

Figure 5:
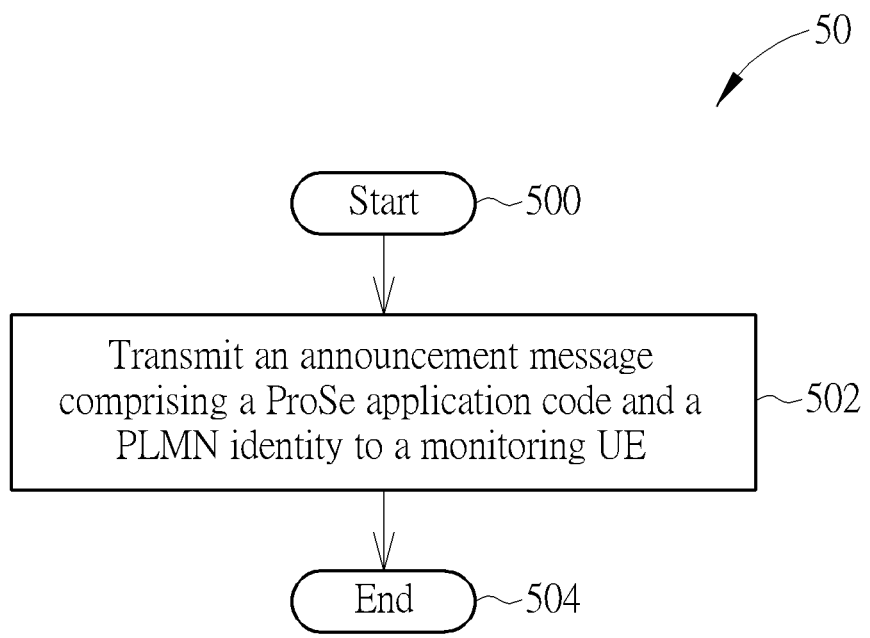
FIG. 5 is a flowchart of a process according to an example of the present invention.

FIG. 5 is a flowchart of a process 50 according to an example of the present invention. The process 50 may be utilized in an announcing UE (e.g., the UE 102 or the UE 104) shown in FIG. 1, to handle a D2D communication. The process 50 may be compiled into the program code 214 and includes the following steps:

Step 500: Start.

Step 502: Transmit an announcement message comprising a ProSe Application Code and a PLMN identity to a monitoring UE.

Step 504: End.

According to the process 50, the announcing UE transmits an announcement message comprising a ProSe Application Code and a PLMN identity to a monitoring UE. That is, except a first PLMN identity in the ProSe Application Code, a second PLMN identity is transmitted in the announcement message to a monitoring UE (e.g., the UE 102 or the UE 104). Accordingly, the monitoring UE can set a monitored PLMN identity to the second PLMN identity. Thus, a method for determining the monitored PLMN identity is proposed from the aspect of the announcing UE, when multiple PLMN identities are received by the monitoring UE. The problem of reception of multiple PLMN identities is solved.

Realization of the present invention is not limited to the above description.

In one example, a resource for transmitting the announcement message may be allocated by the PLMN. In one example, the PLMN may be a registered PLMN of the announcing UE. The PLMN identity may be different from a PLMN identity comprised in the ProSe Application Code. A monitored PLMN identity may be a PLMN identity of a monitored PLMN where a monitoring UE locates.

According to the above description, an example is illustrated as follows. A PLMN assigning a resource for transmitting an announcement message may be a registered PLMN of an announcing UE. When a monitoring UE receives the announcement message including a ProSe Application Code and a PLMN identity of the PLMN, the monitoring UE may set a monitored PLMN to the PLMN identity and may include the monitored PLMN identity in a match report message. As stated previously, the match report message may be forwarded from a Prose function of a HPLMN of the monitoring UE to a ProSe function assigning the ProSe Application Code. If the ProSe function assigning the ProSe Application Code determines that a monitored PLMN with the monitored PLMN identity is authorized, the ProSe function sends a match report acknowledgement message including ProSe Application ID Name(s) to the ProSe function of the HPLMN of the monitoring UE. Then, the Prose function of the HPLMN of the monitoring UE may transmit the ProSe Application ID Name(s) to the monitoring UE.

Figure 6:
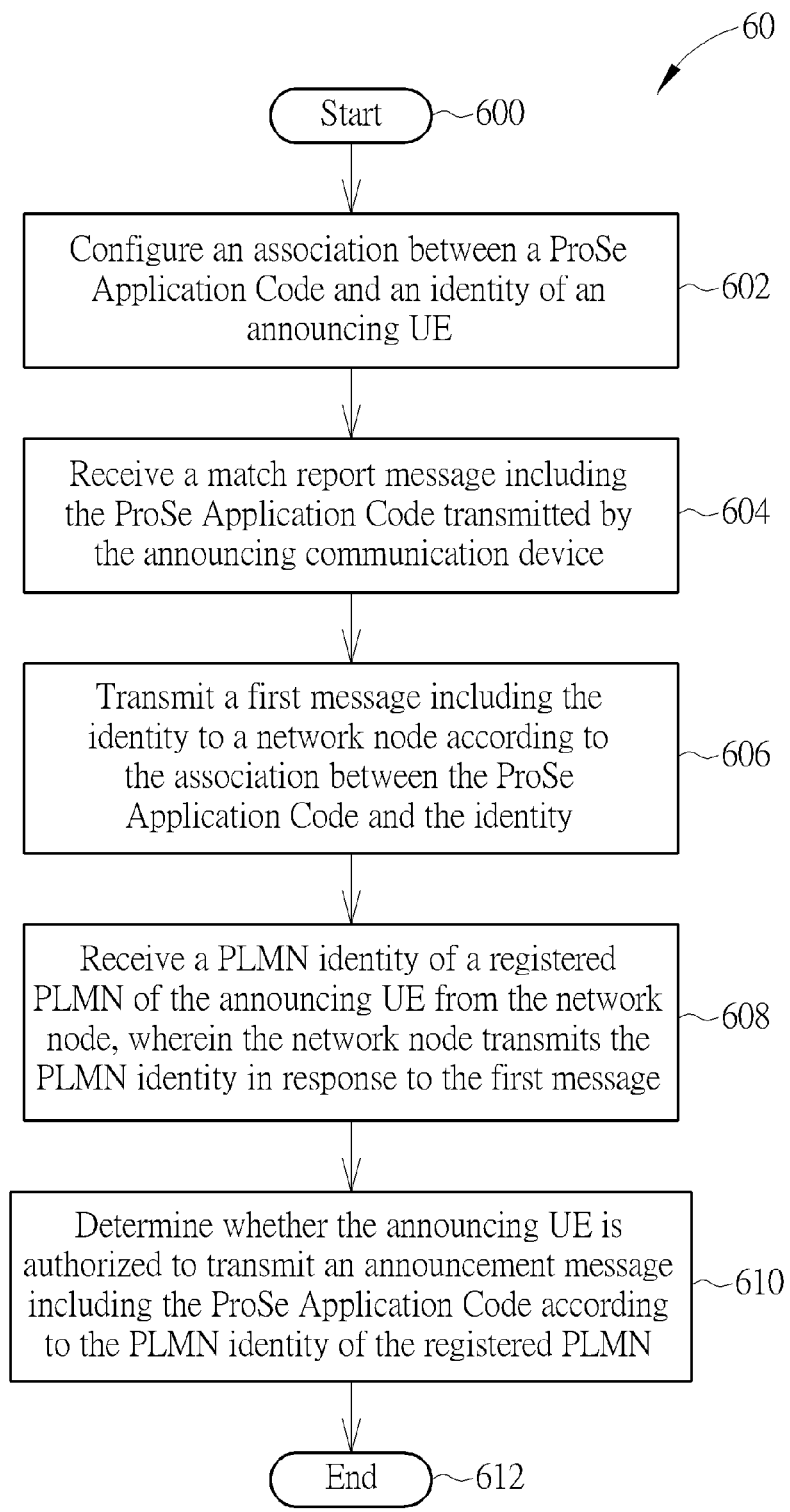
FIG. 6 is a flowchart of a process according to an example of the present invention.

FIG. 6 is a flowchart of a process 60 according to an example of the present invention. The process 60 may be utilized in a ProSe function (e.g., the EPC 1004) shown in FIG. 1, to handle a D2D communication. The process 60 may be compiled into the program code 214 and includes the following steps:

Step 600: Start.

Step 602: Configure an association between a ProSe Application Code and an identity of an announcing UE.

Step 604: Receive a match report message including the ProSe Application Code transmitted by the announcing UE.

Step 606: Transmit a first message including the identity to a network node according to the association between the ProSe Application Code and the identity.

Step 608: Receive a PLMN identity of a registered PLMN of the announcing UE from the network node, wherein the network node transmits the PLMN identity in response to the first message.

Step 610: Determine whether the announcing UE is authorized to transmit an announcement message including the ProSe Application Code according to the PLMN identity of the registered PLMN.

Step 612: End.

According to the process 60, the ProSe function configures (e.g., establishes) an association between a ProSe Application Code and an identity of an announcing UE. After the ProSe function receives a match report message including the ProSe Application Code transmitted by the announcing UE, the ProSe function may transmit a first message including the identity to a network node according to the association between the ProSe Application Code and the identity. Then, the ProSe function may receive a PLMN identity of a registered PLMN of the announcing UE from the network node, wherein the network node transmits the PLMN identity in response to the first message. Thus, the ProSe function may determine whether the announcing UE is authorized to transmit an announcement message including the ProSe Application Code according to the PLMN identity of the registered PLMN. That is, the ProSe function verifies the announcing UE according to the PLMN identity of the registered PLMN of the announcing UE and the association between the ProSe Application Code and the identity. Thus, the ProSe function assigning the ProSe Application Code can correctly ensure that the ProSe Application Code is authorized to be transmitted on a monitored PLMN.

According to the above description, an example is illustrated as follows. When a ProSe function assigns a ProSe Application Code corresponding to a ProSe Application ID to an announcing UE, the ProSe function may store and determine an association between an identity of the announcing UE and the ProSe Application Code. The ProSe function can recognize (i.e., know) the identity of the announcing UE according to the association between the ProSe Application Code and the identity, if the ProSe function receives the ProSe Application Code in a match report message, wherein the ProSe Application Code is transmitted by the announcing UE. Accordingly, the ProSe function may transmit a first message including the identity of the announcing UE to a network node to query a registered PLMN of the announcing UE, after receiving the match report message. In short, the ProSe function may transmit the first message including the identity to the network node according to the association between the ProSe Application Code and the identity. The network node may include (or simply be) a home subscriber server (HSS), a mobility management entity (MME), a serving gateway or a packet data network gateway. After the network node receives the message, the network node may reply a PLMN identity of the registered PLMN of the announcing UE to the ProSe function.

Hence, the ProSe function may know the registered PLMN of the announcing UE, and may determine whether the announcing UE is authorized to transmit an announcement message including the ProSe Application Code. If the ProSe function determines that the announcing UE is authorized to transmit the announcement message, the ProSe function may transmit a match report acknowledgement message including a ProSe Application ID corresponding to the ProSe Application Code to a monitored UE, e.g., via a PLMN where the monitored UE registers. If the ProSe function determines that the announcing UE is not authorized to transmit the announcement message, the ProSe function may transmit a second message indicating that the ProSe Application Code is not valid to the monitored UE, e.g., via the PLMN where the monitored UE registers.

It should be noted that the ProSe function may be integrated with the network node. In this situation, the transmissions between the ProSe function and the network node may not be need (e.g., may be omitted). For example, the omitted transmissions may include the transmission of the first message and the transmission of the PLMN identity of the registered PLMN of the announcing UE.

In the above examples, an announcing UE can be regarded as an example of an announcing communication device, and a monitoring UE can be regarded as an example of a monitoring communication device. A ProSe function may be realized in the network 100, e.g., in the eNB 1002 or the EPC 1004, or may be realized in an independent server. The communication device 20 may be used for realizing an announcing UE, a monitoring UE, a ProSe function and/or a network node mentioned above. The processes 30, 40, 50, 60 and/or abovementioned examples may be combined to obtain various solutions according to system requirements and design considerations, and are not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method for solving the problem of reception/transmission of multiple PLMN identities when a network (e.g., radio access network (RAN), an eNB) is shared by multiple PLMNs. At the UE side, a monitoring UE can determine a monitored PLMN identity properly, and an announcing UE can further transmit a monitored PLMN identity to aid the determination of the monitored PLMN identity. At the network side, a ProSe function assigning a ProSe Application Code can correctly ensure that the ProSe Application Code is authorized to be transmitted on a monitored PLMN.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a device-to-device (D2D) communication, comprising:
a storage unit for storing instructions of:
receiving an announcement message comprising a proximity-based service (ProSe) Application Code comprising a public land mobile network (PLMN) identity;
receiving system information comprising a plurality of PLMN identities;
setting a monitored PLMN identity to the PLMN identity, when the plurality of PLMN identities comprises the PLMN identity; and
transmitting a match report message comprising the monitored PLMN identity; and
a processing means, coupled to the storage unit, configured to execute the instructions stored in the storage unit.

2. The communication device of claim 1, wherein the announcement message is transmitted by an announcing communication device.

3. The communication device of claim 1, wherein the system information is received via a cell of a network.

4. The communication device of claim 1, wherein the plurality of PLMN identities are indicated by PLMN-IdentityList in the system information.

5. A communication device for handling a device-to-device (D2D) communication, comprising:
a storage unit for storing instructions of:
receiving an announcement message comprising a ProSe Application Code comprising a proximity-based service (ProSe) identity;

receiving system information comprising a plurality of public land mobile network (PLMN) identities;

setting a plurality of monitored PLMN identities to the plurality of PLMN identities; and transmitting a match report message comprising the ProSe Application Code and the plurality of monitored PLMN identities; and a processing means, coupled to the storage unit, configured to execute the instructions stored in the storage unit.

6. The communication device of claim 5, wherein the announcement message is transmitted by an announcing communication device.

7. The communication device of claim 5, wherein the system information is received via a cell of a network.

8. The communication device of claim 5, wherein the plurality of PLMN identities are indicated by PLMN-IdentityList in the system information.

9. A communication device for handling a device-to-device (D2D) communication, comprising:

a storage unit for storing instructions of:

configuring an association between a proximity-based service (ProSe) Application Code and an identity of an announcing communication device;

receiving a match report message including the ProSe Application Code transmitted by the announcing communication device;

transmitting a first message including the identity to a network node according to the association between the ProSe Application Code and the identity;

receiving a public land mobile network (PLMN) identity of a registered PLMN of the announcing communication device from the network node, wherein the network node transmits the PLMN identity in response to the first message; and determining whether the announcing communication device is authorized to transmit an announcement message including the ProSe Application Code according to the PLMN identity of the registered PLMN; and a processing means, coupled to the storage unit, configured to execute the instructions stored in the storage unit.

10. The communication device of claim 9, wherein the ProSe Application Code corresponds to the ProSe Application ID, and is assigned to the announcing communication device.

11. The communication device of claim 9, wherein the instruction of transmitting the first message including the identity to the network node according to the association between the ProSe Application Code and the identity comprise:

recognizing the identity of the announcing communication device according to the association between the ProSe Application Code and the identity; and transmit the first message comprising the identity of the announcing communication device to the network node to query the registered PLMN of the announcing communication device.

12. The communication device of claim 9, wherein the instructions further comprise:

transmitting a match report acknowledgement message including a ProSe Application ID corresponding to the ProSe Application Code to a monitoring communication device, if the communication device determines that the announcing communication device is authorized to transmit the announcement message.

13. The communication device of claim 9, wherein the instructions further comprise:

transmitting a second message indicating that the ProSe Application Code is not valid to a monitoring communication device, if the communication device determines that the announcing communication device is authorized to transmit the announcement message.

14. The communication device of claim 9, wherein the network node comprises a home subscriber server (HSS) or a mobility management entity (MME).

15. The communication device of claim 9, wherein the ProSe Application Code is assigned by the communication device to the announcing communication device.

* * * * *